US012810232B2

(12) United States Patent
Berg et al.

(10) Patent No.: US 12,810,232 B2
(45) Date of Patent: Nov. 24, 2026

(54) MACHINE LEARNING FOR IMPROVED ENVIRONMENTAL SUSTAINABILITY IN TRANSPORTATION PROCESSES

(71) Applicant: SAP SE, Walldorf (DE)

(72) Inventors: Gregor Berg, Berlin (DE); Stephan Baier, Oberrieden (DE); Andreas Breitrueck, Oftersheim (DE); Alexander Cramer, Berlin (DE); Timotheus Kampik, Umea (SE); Carolin Krieger, Mannheim (DE); Dominik Schaefer, Munich (DE)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 18/810,071

(22) Filed: Aug. 20, 2024

(65) Prior Publication Data

US 2026/0057329 A1 Feb. 26, 2026

(51) Int. Cl.

| | |
|---|---|
| ***G06Q 10/083*** | (2024.01) |
| ***G06Q 10/0637*** | (2023.01) |
| ***G06Q 10/067*** | (2023.01) |
| ***G06Q 10/08*** | (2024.01) |
| ***G06Q 10/0834*** | (2023.01) |

(52) U.S. Cl.

CPC ..... *G06Q 10/083* (2013.01); *G06Q 10/06375* (2013.01); *G06Q 10/067* (2013.01); *G06Q 10/08* (2013.01); *G06Q 10/0834* (2013.01)

(58) Field of Classification Search

CPC ........... G06Q 10/06375; G06Q 10/067; G06Q 10/0834; G06Q 10/083; G06Q 10/08

See application file for complete search history.

(56) References Cited

U.S. PATENT DOCUMENTS

| | | | | |
|---|---|---|---|---|
| 11,240,278 | B1 * | 2/2022 | Wang | H04L 65/4053 |
| 2023/0061787 | A1 | 3/2023 | Feickert et al. | |
| 2023/0297937 | A1 * | 9/2023 | Nakashima | G06Q 10/0833 705/333 |
| 2024/0354635 | A1 * | 10/2024 | Davaloo | G06Q 10/083 |
| 2025/0265602 | A1 * | 8/2025 | Williams | G06Q 10/08 |

OTHER PUBLICATIONS

Couckuyt, Dries, "A systematic review of Green Business Process Management", Business Process Management Journal vol. 26 No. 2, (2020), 421-446.

(Continued)

*Primary Examiner* — Charles Guiliano

(74) *Attorney, Agent, or Firm* — SCHWEGMAN LUNDBERG & WOESSNER, P.A.

(57) ABSTRACT

In an example embodiment, a machine learning model is trained to predict one or more transportation modes for a portion of a process flow (such as a shipment). This prediction may be based on, for example, the size and weight of the shipment, the distance and geographical features of the distance between the pickup location for the shipment and the delivery location for the shipment. Based on the prediction as well as a calculated metric called "risk of inaccuracy", a sustainability score may be calculated for the shipment. The sustainability score may then be used to recommend one or more actions to adjust a process flow that includes the shipment to reduce environmental impact of the shipment and future similar shipments.

20 Claims, 8 Drawing Sheets

(56) References Cited

OTHER PUBLICATIONS

Gohar, Shahrzad Roohy, "Environmental Sustainability through Green Business Process Management", Australasian Journal of Information Systems, vol. 24, Research Article, (2020), 30 pgs.
Maciel, Joao Carlos, "The Core Capabilities of Green Business Process Management—A Literature Review", 13th International Conference on Wirtschaftsinformatik, (Feb. 12-15, 2017), 1526-1537.
Nowak, Alexander, "An Architecture and Methodology for a Four-Phased Approach to Green Business Process Reengineering", ICT-GLOW 2011, LNCS 6868, (2011), 150-164.
Recker, Jan, "Modeling and Analyzing the Carbon Footprint of Business Processes", Green Business Process Management: Towards the Sustainable Enterprise. pp. 93-109, (2012), 19 pgs.
Stolze, Carl, "Sustainability in business process management research—a literature review", Proceedings of the Eighteenth Americas Conference on Information Systems, (Aug. 9-12, 2012), 11 pgs.
Vitali, Monica, "Towards Greener Applications: Enabling Sustainable-aware Cloud Native Applications Design", Department of Electronics, Information and Bioengineering, (2022), 16 pgs.
Wesumperuma, Ashini, "A Framework for Multi-dimensional Business Process Optimization for GHG Emission Mitigation", 22nd Australasian Conference on Information Systems, (2011), 11 pgs.
Wesumperuma, Ashini, "Green Activity Based Management (ABM) for organisations", 24th Australasian Conference on Information Systems, (Dec. 2013), 11 pgs.

* cited by examiner

MACHINE LEARNING FOR IMPROVED ENVIRONMENTAL SUSTAINABILITY IN TRANSPORTATION PROCESSES

TECHNICAL FIELD

This document generally relates to improving sustainability in transportation processes. More specifically, this document relates to using machine learning for improved environmental sustainability in transportation processes.

BACKGROUND

Environmental sustainability is one of the key objectives for modern organizations, as well as for society at large. Transportation processes are especially influential in whether or not an organization is practicing sustainable processes.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth to provide an understanding of various example embodiments of the present subject matter. It will be evident, however, to those skilled in the art, that various example embodiments of the present subject matter may be practiced without these specific details.

From a process management perspective, it would be desirable to determine and assign exact environmental costs to all cases of a process and then optimize the process' environmental footprint under consideration of other constraints. However, an exact case-level environmental cost assignment is technically challenging, because the complex environment in which a process runs makes it difficult to obtain exact measurements of aspects like the carbon footprint of a case. For example, consider an order-to-cash process and its delivery sub-process. In many cases, an organization will not be able to measure the exact emissions caused by a single delivery (e.g. because the delivery is handled by 3rd-party organizations and even the transportation mode (e.g. truck vs. plane]) may be decided on a per-case basis and not known to the shipping organization), and each shipment can combine multiple transportation modes (e.g., plane for part of the time, train for part of the time, truck for the remainder).

In an example embodiment, a machine learning model is trained to predict one or more transportation modes for a portion of a process flow (such as a shipment). The process flow is a sequence of steps to accomplish some goal. The prediction may be based on, for example, the size and weight of the shipment, the distance and geographical features of the distance between the pickup location for the shipment and the delivery location for the shipment. Based on the prediction as well as a calculated metric called "risk of inaccuracy," a sustainability score may be calculated for the shipment. The sustainability score may then be used to recommend one or more actions to adjust a process flow that includes the shipment to reduce environmental impact of the shipment and future similar shipments.

Figure 1:
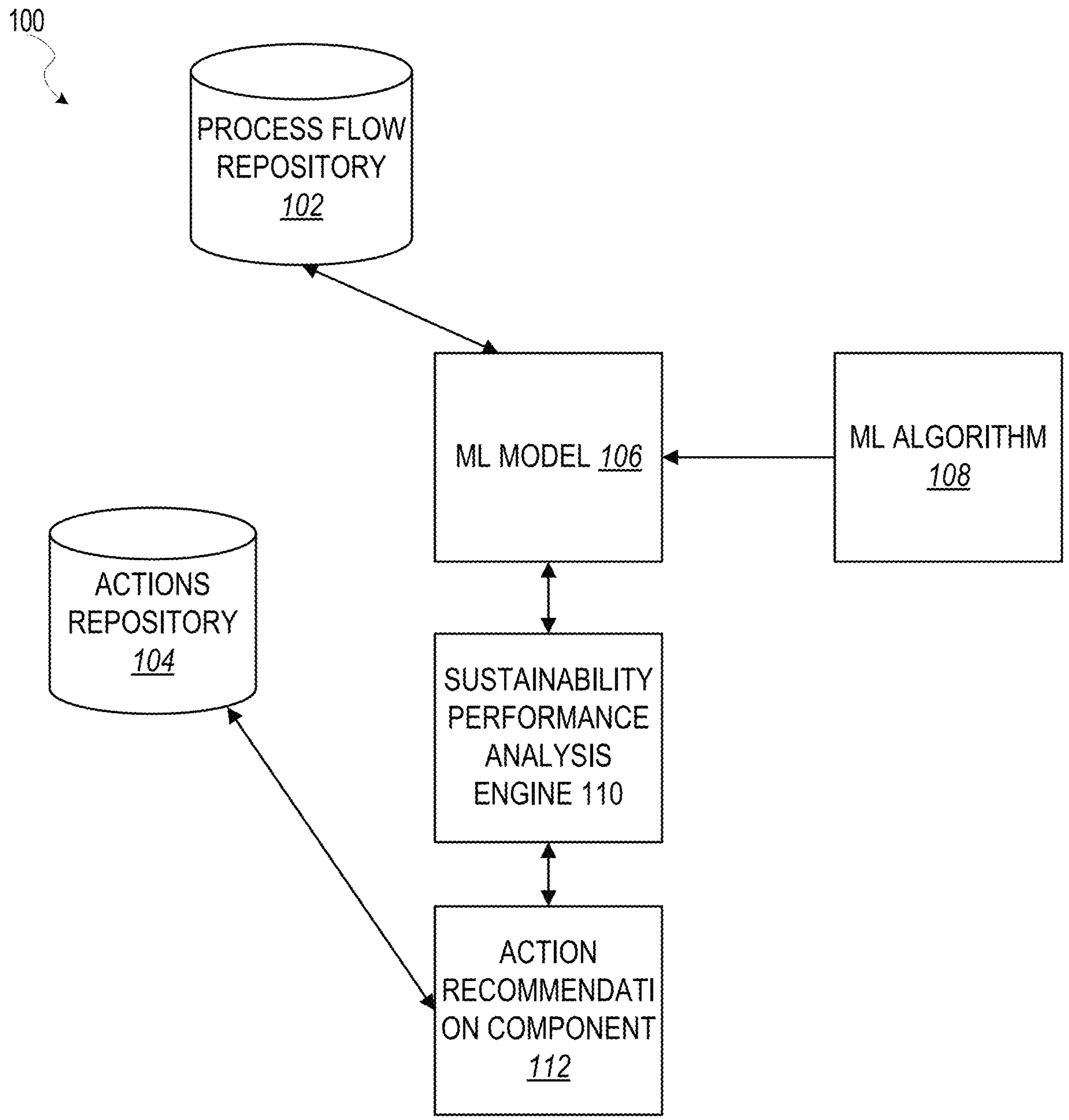
FIG. 1 is a block diagram illustrating a system for reducing environmental impact of shipments, in accordance with an example embodiment.

FIG. 1 is a block diagram illustrating a system 100 for reducing environmental impact of shipments, in accordance with an example embodiment. A process flow repository 102 includes a plurality of different process flows that involve usage of one or more transportation modes. It should be noted that the process flow repository 102 could also include other process flows that do not involve the usage of one or more transportation modes, but such other process flows are not involved in the techniques described in this disclosure and thus for purposes of the present disclosure only process flows that involve the usage of one or more transportation modes will be discussed.

Each process flow comprises a sequence of steps involved in a process relevant to an organization. If the organization, for example, distributes goods by selling those goods and then shipping those goods to customers, then a process flow for that organization may describe all the steps involved in selling a product and then packaging and shipping the product to the customer. In some cases, the process flow may be simple, such as one involving the processing of an order for a single item to a single customer, the packaging of that order, the requesting of a shipment of the order from a 3$^{rd}$ party delivery service, and the transfer of the shipment to the 3$^{rd}$ party delivery service. Other process flows may be more complicated, such as where an order contains requests for multiple products stored in warehouses in different locations, and the process flow may involve determining which of these multiple products to combine into a shipment and how to accomplish such a combination.

Each process flow has one or more actions that can be taken upon the process flow to modify the process flow in some way. Many of these actions do not affect the environmental impact of the process flow, but some actions do. For example, moving the warehouse where a product is stored to a location that is geographically closer to the recipient (or otherwise geographically less impactful, such as to a city with a sea or river port that could be used for the shipment) can reduce the environmental impact of the process flow. These actions, however, are not necessarily always desirable actions to implement. In the above example, it may be that moving the warehouse to a seaport is not cost effective given the price of the product. These actions may be stored in an actions repository 104.

It would be desirable to analyze the processes in the process flow to determine whether one or more actions may be taken to streamline or otherwise improve the process flows in a manner that reduces their environmental impact without undue burden on the organization (how much burden an organization finds undue will of course depend on the organization's dedication to environmental causes, among other factors). However, such an analysis is susceptible to being inaccurate without knowing what transportation mode (s) is/are going to be used in the process flow and how much each transportation mode(s) is going to be used.

A machine learning model 106 is provided that is trained by a machine learning algorithm 108 to predict a transportation mode(s) for a process flow from the process flow repository 102 in a given situation. Thus, the machine learning model 106 takes as input information about a given situation. In this context, the term "given situation" describes a scenario where one or more modes of transportation are used during a specific use of a process flow. Thus, for example, a single order being processed and shipped would be considered to be a "given situation." Each process flow can have an infinite number of such situations (e.g., each time a product is purchased by a customer it may represent a different situation where the process flow for order processing is utilized).

The information about a given situation that is passed to the machine learning model 106 can be any information that is relevant to determining a likely transportation mode or modes to be used during a corresponding process flow. This may include, for example, information about the size and weight of ordered products, as well as a delivery location and the duration of travel. Information about the shipment location may be passed separately from the information about the given situation, as part of the process flow, which is retrieved from the process flow repository 102.

The machine learning model 106 may be trained using one of many different types of machine learning techniques. Specifically, the machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbors, decision trees, and hidden Markov models.

In an example embodiment, a machine learning algorithm used to train a machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

Training data may comprise information about past uses of transportation mode(s) by process flows. Specifically, historical data from shipments where the mode(s) of transportation was known can be used as the training data.

In some example embodiments, the training of these machine learning models may take place as a dedicated training phase. In other example embodiments, the machine learning models may be retrained dynamically at runtime based on, for example, developer or user feedback.

The machine learning model 106 is trained to predict one or more modes of transportation used in a process flow. This prediction may include a list of the modes of transportation predicted to be used and the percentage that each mode of transportation is used. In an example embodiment, this percentage is based on the relative usage of a mode of transportation with respect to other modes of transportation in the process flow along some unit of measurement relevant to the environmental impact. In an example embodiment, this unit of measurement is distance because fuel usage is largely tied to distance traveled and fuel usage is related. Thus, for example, the machine learning model 106 may predict that a given scenario will result in transportation usage such that 90% of the miles traveled are by plane, and 10% of the miles traveled are by truck.

The predicted mode(s) of transportation are then passed to a sustainability performance analysis engine 110. The sustainability performance analysis engine 110 calculates a sustainability score for a process flow in any given scenario. More particularly, given a sustainability goal G (e.g., "reduce emissions of delivery process by 20%"), an ideal metric M is defined. The ideal metric M may be a calculation of the environmental impact of a process flow in any given scenario, based on a perfect understanding of the transportation mode used. Also defined is a proxy metric M', which is an approximation of the environmental impact of the process flow in any given scenario, based on the information actually known (e.g., without perfect knowledge of the exact modes of transportation used and how much each is used). A risk of uncertainty is calculated representing the concerns and risks that come with using the proxy metric M' rather than metric M. The risk of uncertainty may be based on a confidence level of the predicted mode(s) of transportation (such a confidence level being output by the machine learning model 106) as well as a cost (in money and/or environmental impact) of being incorrect.

The risk of uncertainty may be based on a combination of the transportation distance, transportation geography (e.g., whether there is an ocean separating the origin and the destination, whether there are rail tracks between them, etc.), information about the shipment itself and the duration. More particularly, each of these factors can interrelate in ways that make the prediction of the machine learning model have a higher or lower confidence. Specifically, extremely short durations have high levels of confidence over larger distances, because an airplane is really the only viable mode of transportation to travel large distances in short times. Longer durations also have high levels of confidence, since those tend to imply that an airplane was not used, while a differentiation between non-airplane modes of transportation can usually be predicted based on the geography between the origin and the destination (e.g., a two-week travel time between two countries separated by an ocean suggests the use of a ship, whereas the same two week travel time would suggest the use of a train or truck if the two countries are located on the same continent, although other geographic features can also impact that prediction, such as whether there is a rail line between the origin and the destination, whether there is a river between the origin and the destination, etc.). The risk of uncertainty is higher when the duration is in some sort of middle ground, where it may be more ambiguous whether an airplane was involved or not.

Additionally, information about the shipment itself may also be relevant to this analysis. If the shipment includes, for example, a critical good that needs to be shipped quickly, such as frozen/refrigerated items or medical goods, then this information would impact not only the risk of uncertainty but also the recommendations (e.g., one would likely not recommend that a train be substituted for a plane if the item being shipped is a kidney intended for transplant).

The sustainability score is then used by an action recommendation component 112 to recommend one or more actions from the Actions Repository 104, and to provide the impact of the actions on the sustainability score.

An action is then selected by the user, which modifies the process flow and changes some aspect of the process flow that affects the mode(s) of transportation and/or their durations of use during the execution of the process flow. The result is a reduction of environmental impact of the process flow that is tailored to the needs of the user.

The following is an example depicting the above techniques. In this example, the environmental footprint of a process flow that includes a global supply chain is provided. Here, a good is produced in country C1 and sold in country C2. Possible metrics M include the environmental footprint of the process and the carbon dioxide emissions from transportation based on the weight of the good G. The distance between country C1 and country C2 is 10,000 km. The two countries are connected, however, by train rail. The duration of the trip is 3 days. The machine learning model may predict, based on historical information, with a high degree of confidence that a plane will be used for a large portion of the transportation of the good G since the distance is so great for such a short travel duration.

Based on this prediction, even without knowing the exact mode(s) of transportation of good G between countries C1 and C2, the sustainability score for the process flow is calculated. Then, one or more actions from the Actions Repository 104 are recommended based on their effect on the sustainability score. For example, one action would be to move the production site to country C2, reducing the distance between the shipping origin and the shipping destination (and thus reducing or eliminating the need for an airplane to be used). The precise effect on the sustainability score of such an action can be estimated and displayed to a user, along with other estimated effects of the action, such as the investment cost in building another factor in country C2. Another possible action would be to increase the shipping duration to 2 weeks. The effect that action can have on the sustainability score can similarly be estimated and displayed to the user, along with other estimated effects of the action, such as the increased lead time.

In another example, assume that a good G is shipped from an origin to a destination repeatedly, such as once a day. Even without knowing the exact transportation modes involved in such shipments, a sustainability score for a correlated process flow can be calculated based on a prediction by the machine learning model 106 of the transportation mode(s) involved. Then, one or more actions from the actions repository 104 are recommended based on their effect on the sustainability score. For example, one action would be to delay shipment so that all goods G are shipped on a single day of the week, combining shipments to reduce fuel usage. The precise environmental impact of this action can therefore be estimated and displayed to the user, along with other estimated effects of the action, such as the increased coordination effort needed to accomplish the combinations of shipments and the lead time increase. Other similar actions may also be compared to one another (e.g., combining 5 days shipment versus combining 3 days shipment, which may result in less environmental impact savings but less difficulty in coordination efforts and lead time increases). Another possible action would be to switch to electric transportation vehicles, which may be only suitable for urban areas and have an increased initial cost.

Figure 2:
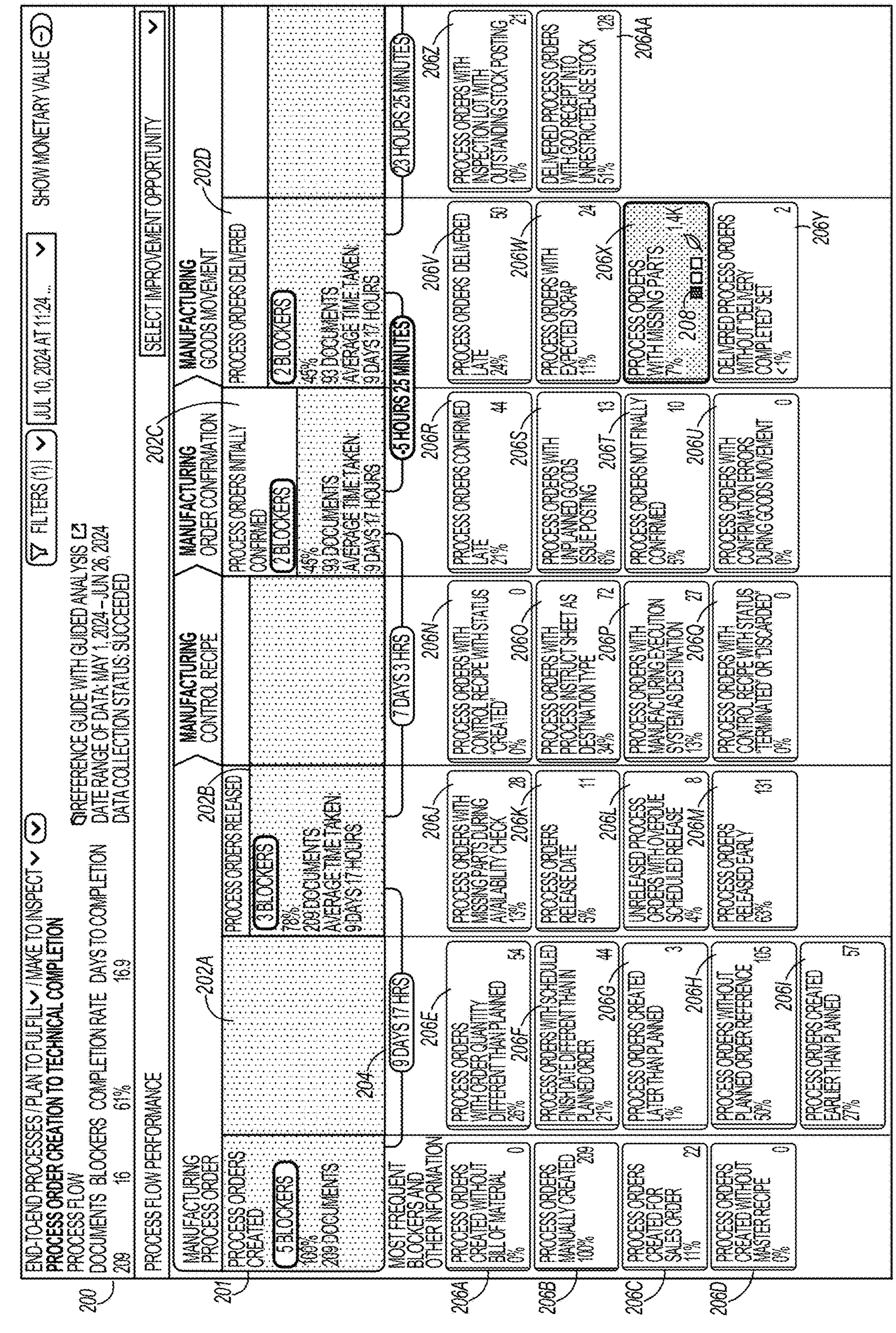
FIG. 2 is a screen capture illustrating a user interface in accordance with an example embodiment.

FIG. 2 is a screen capture illustrating a user interface 200 in accordance with an example embodiment. Here, the user interface 200 depicts an interactive depiction of a process flow 201, in accordance with an example embodiment. Specifically, here the process flow 201 has four steps: 202A, 202B, 202C, 202D. In step 202A, purchase order items are created. In step 202B, supplier invoices are created. In step 202C, finance-accounts payable (FI-AP) items are created. In step 202D, FI-AP clearing documents are created. The average timespan between each step 202A, 202B, 202C, 202D is also depicted, such as timespan 204, indicating that on average there are nine days and seventeen hours between step 202A and step 202B.

Also depicted are a series of context boxes: 206A, 206B, 206C, 206D, 206E, 206F, 206G, 206H, 206I, 206J, 206K, 206L, 206M, 206N, 206O, 206P. These context boxes 206A, 206B, 206C, 206D, 206E, 206F, 206G, 206H, 206I, 206J, 206K, 206L, 206M, 206N, 206O, 206P, 206Q, 206R, 206S, 206T, 206U, 206V, 206W, 206X, 206Y, 206Z; each depicting some different relevant information about a corresponding step 202A, 202B, 202C, 202D and are organized so that it is easy to visually relate each context box 206A, 206B, 206C, 206D, 206E, 206F, 206G, 206H, 206I, 206J, 206K, 206L, 206M, 206N, 206O, 206P, 206Q, 206R, 206S, 206T, 206U, 206V, 206W, 206X, 206Y, 206Z with a corresponding step 202A, 202B, 202C, 202D. Here, this is depicted by placing the context box below the corresponding step. Thus, for example, context boxes 206A, 206B, 206C, 206D, 206E, 206F, 206G are depicted below step 202A, meaning that each of those context boxes 206A, 206B, 206C, 206D, 206E, 206F, 206G contains some information regarding step 202A.

In an example embodiment, one or more of the context boxes 206A, 206B, 206C, 206D, 206E, 206F, 206G, 206H, 206I, 206J, 206K, 206L, 206M, 206N, 206O, 206P, 206Q, 206R, 206S, 206T, 206U, 206V, 206W, 206X, 206Y, 206Z provide information about a "blocker." A blocker is some sort of inefficiency that extends the timespan between steps 202A, 202B, 202C, 202D. Thus, for example, context box 206B indicates that process orders manually created occurred in 100% of the orders. Also depicted is the number of times that inefficiency occurred in the historical information. Here, for example, process orders manually created occurred two hundred and nine times.

Figure 3:
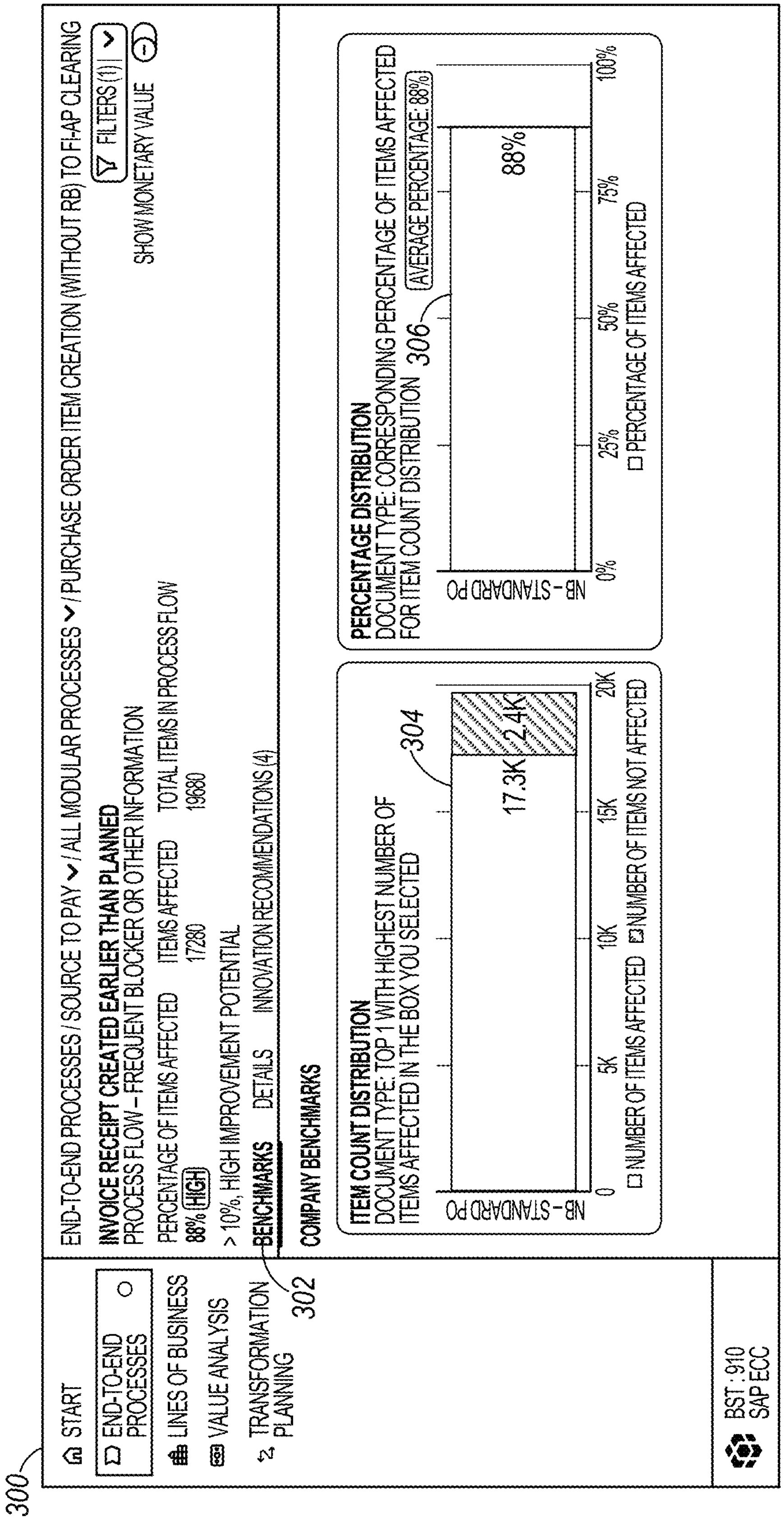
FIG. 3 is a diagram illustrating a screen capture of the user interface at a different screen, in accordance with an example embodiment.

A user is able to click on a context box 206A, 206B, 206C, 206D, 206E, 206F, 206G, 206H, 206I, 206J, 206K, 206L, 206M, 206N, 206O, 206P,, 206Q, 206R, 206S, 206T, 206U, 206V, 206W, 206X, 206Y, 206Z to launch a screen that provides even more information about that corresponding context box 206A, 206B, 206C, 206D, 206E, 206F, 206G, 206H, 206I, 206J, 206K, 206L, 206M, 206N, 206O, 206P, 206Q, 206R, 206S, 206T, 206U, 206V, 206W, 206X, 206Y, 206Z. FIG. 3 is a diagram illustrating a screen capture of the user interface 200 of FIG. 2 at a different screen, in accordance with an example embodiment. Here, the user has selected a context box relating to "invoice receipt created earlier than planned" (not depicted in FIG. 2), causing screen 300 to be displayed to provide more information about that context box, namely about invoices receipts created earlier than planned.

Additionally, here the user has selected a benchmarks tab 302, causing the screen 300 to display various benchmarks related to the invoice receipt creation. Specifically, an item count distribution graph 304 is provided indicating the relative percentages of items with invoice receipts created earlier than planned that affected some aspect of the process flow (e.g., delays) as contrasted with items with invoice receipts created earlier than planned that did not affect some aspect of the process flow items. A separate percentage distribution graph 306 indicates the overall percentage of items affected by invoice receipts created earlier than planned that affected some aspect of the process flow.

Figure 4:
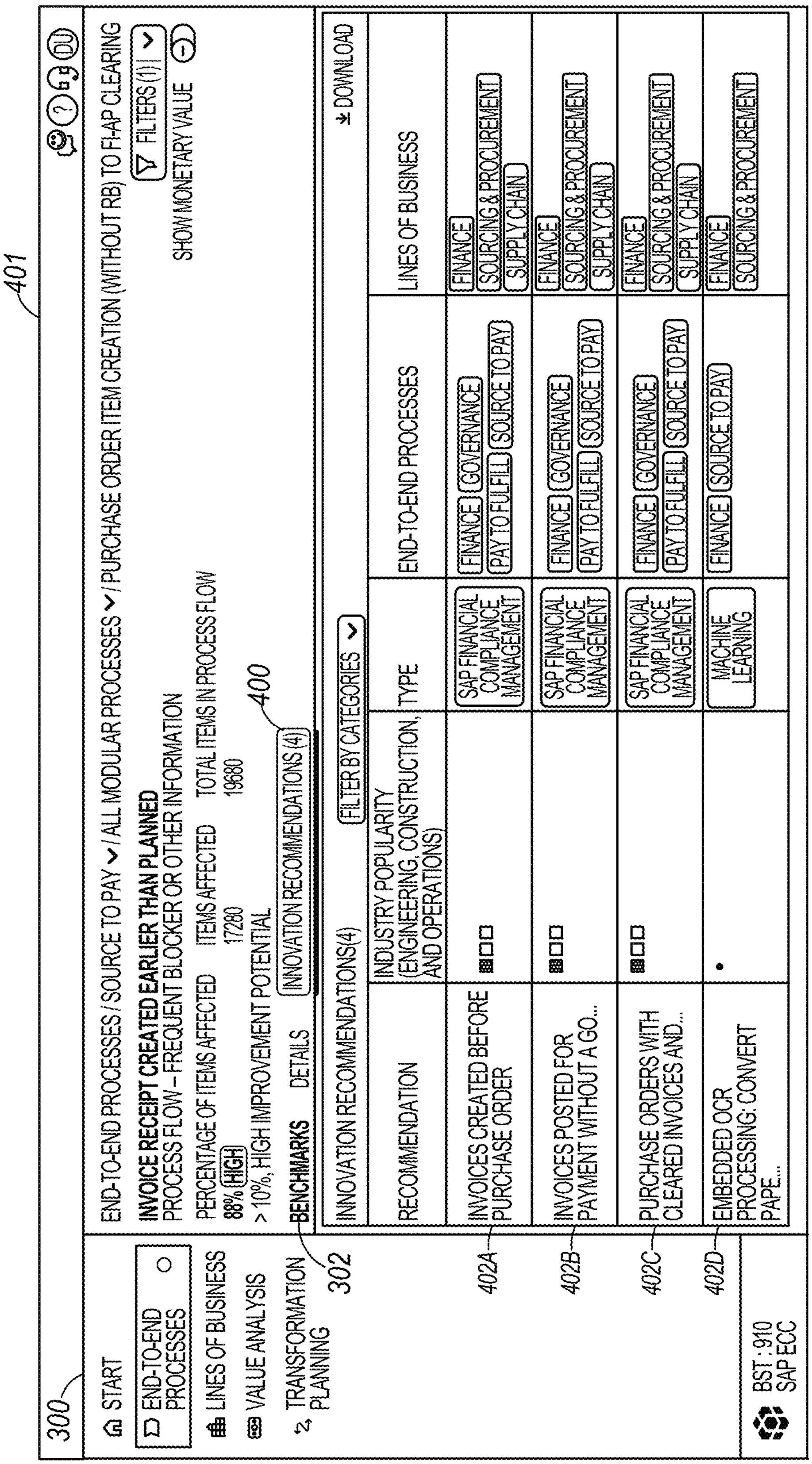
FIG. 4 is a diagram illustrating a screen capture of the user interface at another different screen, in accordance with an example embodiment.

FIG. 4 is a diagram illustrating a screen capture of the user interface 200 at another different screen, in accordance with an example embodiment. Here, the user has selected the innovation recommendations tab 400, causing the screen 401 to display various recommendations 402A, 402B, 402C, 402D on how to modify the process flow to improve some aspect of the process flow. Here, for example, a recommendation 402A to have invoices created before the purchaser order is one potential solution to the "blocker" of invoices receipts created earlier than planned.

Referring to FIG. 2, for any step 202A, 202B, 202C, 202D that includes some actions that utilize some form of transportation, a specialized context box 206X may be provided. Here, for example, step 202D involves the shipping of goods to the purchaser. The specialized context box 206X depicts a visual indicator off the sustainability score of the corresponding step 202D. Here, the specialized context box 206X includes a box 208 having a color within it indicative of the sustainability score. Specifically, while color may not be depicted in FIG. 2, the color in the box 208 may be, for example, red, orange, or green, indicating a corresponding level of sustainability. If step 202D has a high sustainability score based on the transportation methods used within it, then the color may be green. If step 202D has a high sustainability score based on the transportation methods used within it, then the color may be green. If step 202D has a medium sustainability score based on the transportation methods used within it, then the color may be yellow.

Interacting with the specialized context box 206X via the user interface, such as by selecting, can bring up a screen similar to the screen 401 depicted in FIG. 4, albeit with additional recommendations indicative of changes in the transportation mode. Other information related to such changes, such as an indication of how much a sustainability score will increase and how long an added delay there will be in the transportation if the change is implemented, can also be displayed here.

Figure 5:
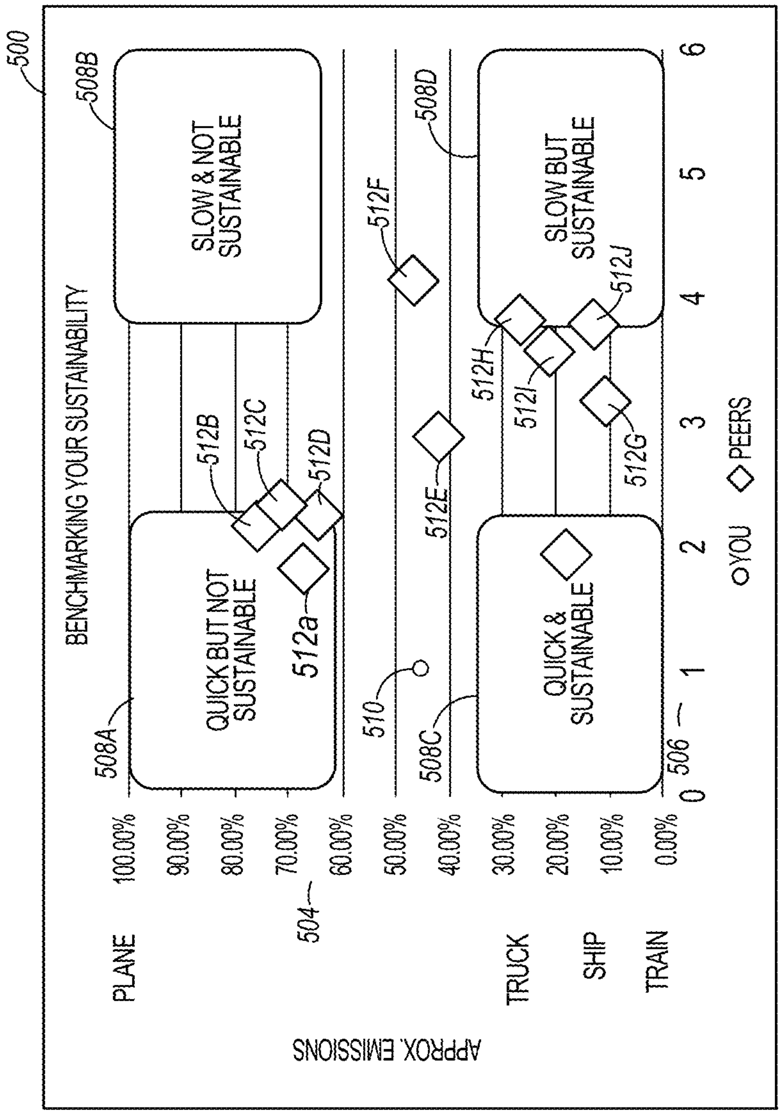
FIG. 5 is a diagram illustrating a screen capture of the user interface at yet another different screen, in accordance with an example embodiment.

FIG. 5 is a diagram illustrating a screen capture of the user interface 200 of FIG. 2 at yet another different screen, in accordance with an example embodiment. Here, a screen 500 depicts a visual indication of environmental sustainability benchmarks. Specifically, a graph 502 is provided having one axis 504 for emissions and another axis 506 for duration. Four quadrants 508A, 508B, 508C, 508D are visually depicted, with each quadrant 508A, 508B, 508C, 508D representing a different combination of duration and emission usage. The emissions usage of the action with respect to duration of the process flow that is being considered for change to improve sustainability is depicted as point 510, whereas points 512A, 512B, 512C, 512D, 512E, 512F, 512G, 512H, 512I, 512J represent emissions usage with respect to duration of similar actions by similar entities (e.g., competitors).

Figure 6:
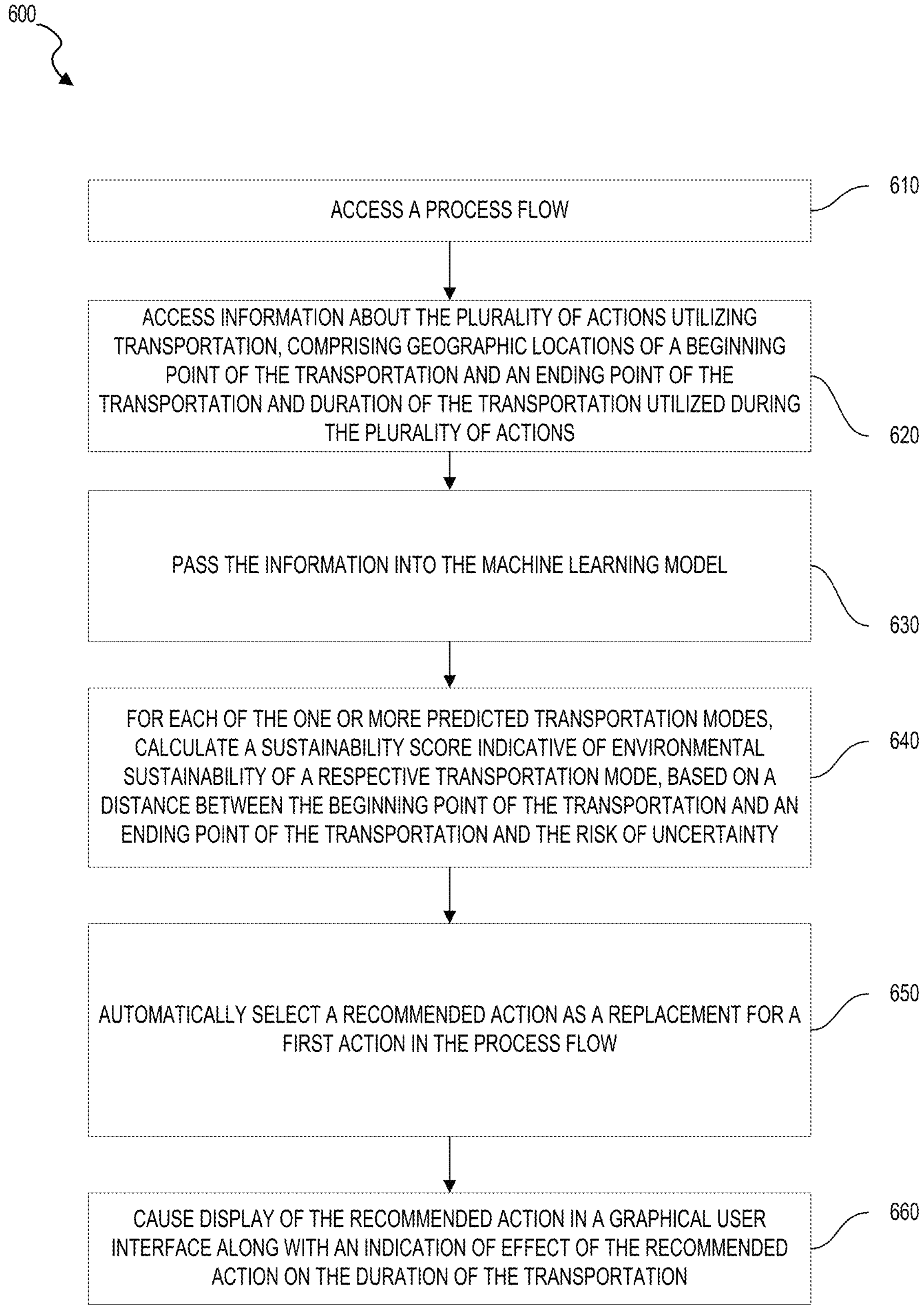
FIG. 6 is a flow diagram illustrating a method, in accordance with an example embodiment.

FIG. 6 is a flow diagram illustrating a method 600, in accordance with an example embodiment. At operation 610, a process flow is accessed. The process flow defines a series of steps in accomplishing a goal, at least one of the steps in the process flow having a plurality of actions, at least one of the plurality of actions utilizing transportation, wherein a transportation mode for the transportation is not known by the entity.

At operation 620, information about the plurality of actions utilizing transportation, including geographic locations of a beginning point of the transportation and an ending point of the transportation and duration of the transportation utilized during the plurality of actions, is accessed.

At operation 630, the information is passed into a machine learning model trained to predict one or more transportation modes. This outputs one or more predicted transportation modes and a confidence level for each corresponding prediction.

At operation 640, for each of the one or more predicted transportation modes, a sustainability score indicative of environmental sustainability of a respective transportation mode is calculated, based on a distance between the beginning point of the transportation and an ending point of the transportation and the risk of uncertainty.

At operation 650, a recommended action is automatically selected as a replacement for a first action in the process flow, from a repository of actions based on the sustainability score for each of the one or more predicted transportation mode and a sustainability score of the recommended action, such that environmental sustainability of the recommended action is higher than environmental sustainability of the first action.

At operation 660, display of the recommended action in a graphical user interface is caused, along with an indication of the effect of the recommended action on the duration of the transportation.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations at an entity, the operations comprising: accessing a process flow having a plurality of actions related to at least one transportation mode not known by the entity; accessing information, for each of the plurality of actions, comprising geographic locations of a beginning point and an ending point of a transportation using the at least one transportation mode, and duration of the transportation; passing the information into a machine learning model trained to predict one or more transportation modes based on the information, the machine learning model generating one or more predicted transportation modes and a confidence level of each corresponding prediction; for each of the one or more predicted transportation modes, calculating a sustainability score indicative of environmental sustainability of a respective transportation mode, based on a distance between the beginning point of the transportation and the ending point of the transportation and the confidence level; automatically selecting a recommended action as a replacement for a first action in the process flow from a repository of actions based on the sustainability score for each of the one or more predicted transportation mode and a sustainability score of the recommended action, such that environmental sustainability of the recommended action is higher than environmental sustainability of the first action; and causing display of the recommended action in a graphical user interface along with an indication of an effect of the recommended action on the duration of the transportation.

In Example 2, the subject matter of Example 1 comprises, wherein the operations further comprise: causing display of a context box in a first screen of the graphical user interface, the first screen depicting the process flow, wherein the context box is placed in a position indicating that the context box pertains to the first action, wherein the context box contains a visual indication of a sustainability score of the first action.

In Example 3, the subject matter of Example 2 comprises, wherein the context box is selectable such that, in response to a user selecting the context box in the graphical user interface, the first screen is replaced by a second screen containing the recommended action.

In Example 4, the subject matter of Examples 2-3 comprises, wherein the visual indication is a color indicative of a classification of the sustainability score.

In Example 5, the subject matter of Examples 2-4 comprises, wherein the operations further comprise: causing display of a benchmark comparison between the environmental sustainability for the first entity of the first action as related to the duration of transportation, and environmental sustainability of similar actions by similar entities, wherein the benchmark is rendered in the graphical user interface as a graph having emission usage on one axis and during on another axis, the graph containing four visually depicted quadrants, and wherein the environmental sustainability, for the first entity, of the first action as related to the duration of transportation, is displayed as one point in one of the quadrants and each environmental sustainability benchmark from the similar entities displayed as another point in one of the quadrants.

In Example 6, the subject matter of Examples 1-5 comprises, wherein the machine learning model is trained by a machine learning model based on historical process flow information, the historical process flow information comprising information about past usages of the process flow, the information comprising transportation mode(s) utilized during the past usages, duration of transportation during the past usages, and beginning point of the transportation and an ending point of the transportation during the past usages.

In Example 7, the subject matter of Examples 1-6 comprises, wherein the sustainability score is based on impact of the transportation on carbon dioxide levels.

Example 8 is a method comprising: accessing a process flow having a plurality of actions related to at least one transportation mode not known by the entity; accessing information, for each of the plurality of actions, comprising geographic locations of a beginning point and an ending point of a transportation using the at least one transportation mode, and duration of the transportation; passing the information into a machine learning model trained to predict one or more transportation modes based on the information, the machine learning model generating one or more predicted transportation modes and a confidence level of each corresponding prediction; for each of the one or more predicted transportation modes, calculating a sustainability score indicative of environmental sustainability of a respective transportation mode, based on a distance between the beginning point of the transportation and the ending point of the transportation and the confidence level; automatically selecting a recommended action as a replacement for a first action in the process flow from a repository of actions based on the sustainability score for each of the one or more predicted transportation mode and a sustainability score of the recommended action, such that environmental sustainability of the recommended action is higher than environmental sustainability of the first action; and causing display of the recommended action in a graphical user interface along with an indication of an effect of the recommended action on the duration of the transportation.

In Example 9, the subject matter of Example 8 comprises, wherein the operations further comprise: causing display of a context box in a first screen of the graphical user interface, the first screen depicting the process flow, wherein the context box is placed in a position indicating that the context box pertains to the first action, wherein the context box contains a visual indication of a sustainability score of the first action.

In Example 10, the subject matter of Example 9 comprises, wherein the context box is selectable such that, in response to a user selecting the context box in the graphical user interface, the first screen is replaced by a second screen containing the recommended action.

In Example 11, the subject matter of Examples 9-10 comprises, wherein the visual indication is a color indicative of a classification of the sustainability score.

In Example 12, the subject matter of Examples 9-11 comprises, causing display of a benchmark comparison between the environmental sustainability for the first entity of the first action as related to the duration of transportation, and environmental sustainability of similar actions by similar entities, wherein the benchmark is rendered in the graphical user interface as a graph having emission usage on one axis and during another axis, the graph containing four visually depicted quadrants and wherein the environmental sustainability, for the first entity of the first action, as related to the duration of transportation, is displayed as one point in one of the quadrants and each environmental sustainability benchmark from the similar entities displayed as another point in one of the quadrants.

In Example 13, the subject matter of Examples 8-12 comprises, wherein the machine learning model is trained by a machine learning model based on historical process flow information, the historical process flow information comprising information about past usages of the process flow, the information comprising transportation mode(s) utilized during the past usages, duration of transportation during the past usages, and beginning point of the transportation and an ending point of the transportation during the past usages.

In Example 14, the subject matter of Examples 8-13 comprises, wherein the sustainability score is based on impact of the transportation on carbon dioxide levels.

Example 15 is a non-transitory machine-readable medium storing instructions which, when executed by one or more processors, cause the one or more processors to perform operations comprising: accessing a process flow having a plurality of actions related to at least one transportation mode not known by the entity; accessing information, for each of the plurality of actions, comprising geographic locations of a beginning point and an ending point of a transportation using the at least one transportation mode, and duration of the transportation; passing the information into a machine learning model trained to predict one or more transportation modes based on the information, the machine learning model generating one or more predicted transportation modes and a confidence level of each corresponding prediction; for each of the one or more predicted transportation modes, calculating a sustainability score indicative of environmental sustainability of a respective transportation mode, based on a distance between the beginning point of the transportation and the ending point of the transportation and the confidence level; automatically selecting a recommended action as a replacement for a first action in the process flow from a repository of actions based on the sustainability score for each of the one or more predicted transportation mode and a sustainability score of the recommended action, such that environmental sustainability of the recommended action is higher than environmental sustainability of the first action; and causing display of the recommended action in a graphical user interface along with an indication of an effect of the recommended action on the duration of the transportation.

In Example 16, the subject matter of Example 15 comprises, wherein the operations further comprise: causing display of a context box in a first screen of the graphical user interface, the first screen depicting the process flow, wherein the context box is placed in a position indicating that the context box pertains to the first action, wherein the context box contains a visual indication of a sustainability score of the first action.

In Example 17, the subject matter of Example 16 comprises, wherein the context box is selectable such that, in response to a user selecting the context box in the graphical user interface, the first screen is replaced by a second screen containing the recommended action.

In Example 18, the subject matter of Examples 16-17 comprises, wherein the visual indication is a color indicative of a classification of the sustainability score.

In Example 19, the subject matter of Examples 16-18 comprises, wherein the operations further comprise: causing display of a benchmark comparison between the environmental sustainability, for the first entity, of the first action as related to the duration of transportation, and environmental sustainability of similar actions by similar entities, wherein the benchmark is rendered in the graphical user interface as a graph having emission usage on one axis and during on another axis, the graph containing four visually depicted quadrants, and wherein the environmental sustainability, for the first entity, of the first action as related to the duration of transportation, is displayed as one point in one of the quadrants and each environmental sustainability benchmark from the similar entities is displayed as another point in one of the quadrants.

In Example 20, the subject matter of Examples 16-19 comprises, wherein the machine learning model is trained by a machine learning model based on historical process flow information, the historical process flow information comprising information about past usages of the process flow, the information comprising transportation mode(s) utilized during the past usages, duration of transportation during the past usages, and beginning point of the transportation and an ending point of the transportation during the past usages.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 7:
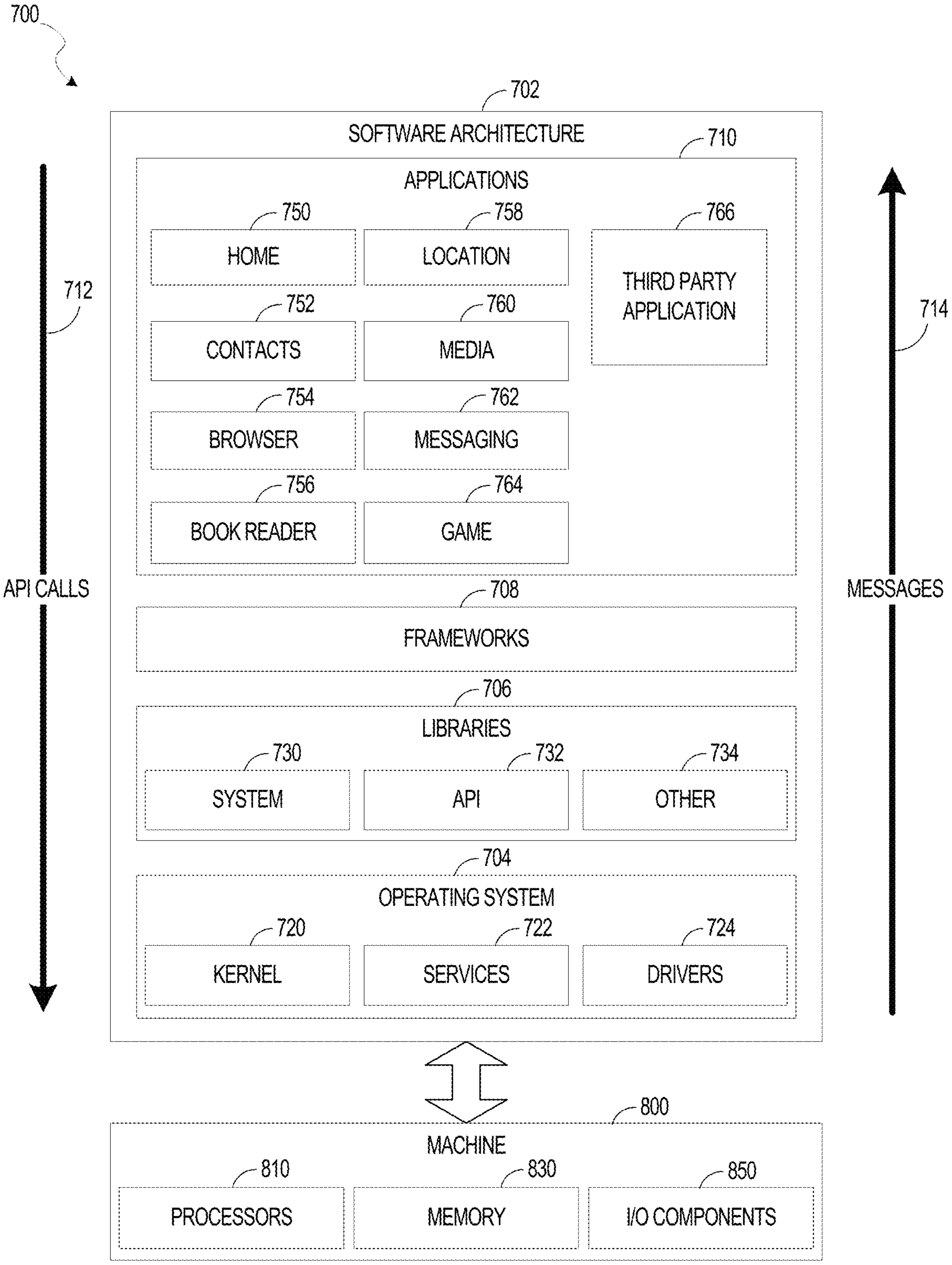
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus [USB] drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 [MPEG4], Advanced Video Coding [H.264 or AVC], Moving Picture Experts Group Layer-3 [MP3], Advanced Audio Coding [AAC], Adaptive Multi-Rate [AMR] audio codec, Joint Photographic Experts Group [JPEG or JPG], or Portable Network Graphics [PNG]), graphics libraries (e.g., an OpenGL framework used to render in two dimensions [2D] and three dimensions [3D] in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
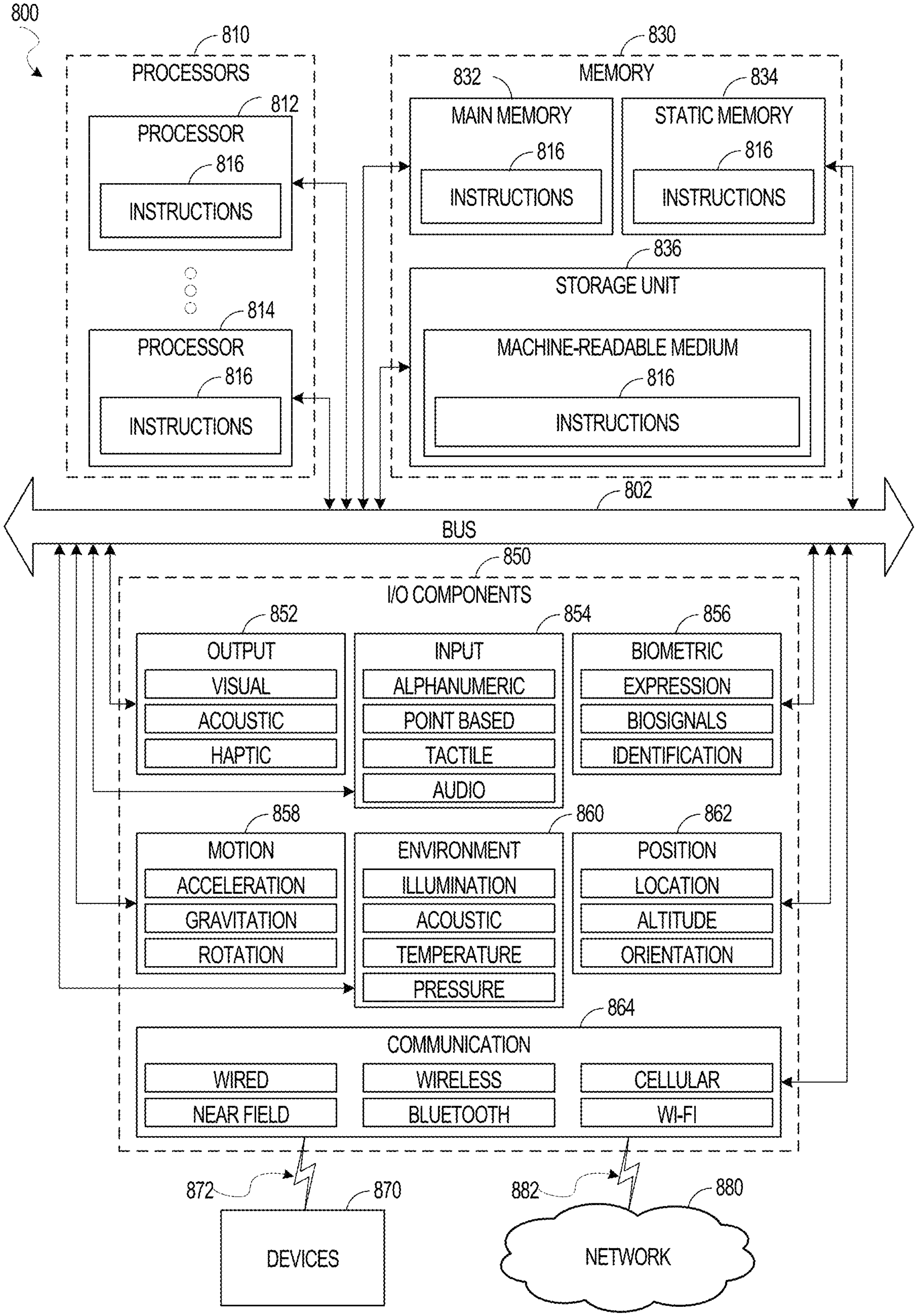
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800.

Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel [PDP], a light-emitting diode [LED] display, a liquid crystal display [LCD], a projector, or a cathode ray tube [CRT]), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (e.g., 830, 832, 834, and/or memory of the processor[s] 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium"discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol [HTTP]). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations at an entity, the operations comprising:

accessing a process flow having a plurality of actions related to at least one transportation mode not known by the entity, the process flow comprising a set of actions to be performed for a plurality of different future cases, the set of actions including some transportation actions as well as some non-transportation actions;

accessing information, for each of the transportation actions, comprising geographic locations of a beginning point and an ending point of a transportation using the at least one transportation mode, and duration of the transportation;

passing the information into a machine learning model trained to predict one or more transportation modes for the plurality of different future cases based on the information, the machine learning model generating one or more predicted transportation modes and a confidence level of each corresponding prediction, wherein the confidence level represents a quantified measure of certainty of the machine learning model in predicting the at least one transportation mode that is not known by the entity;

for each of the one or more predicted transportation modes, calculating a sustainability score indicative of environmental sustainability of a respective transportation mode, by combining a distance between the beginning point of the transportation and the ending point of the transportation with the confidence level, such that the confidence level weights a contribution of the distance to the sustainability score;

automatically selecting a recommended action as a replacement for a non-transportation action in the process flow from a repository of actions based on the sustainability score for each of the one or more predicted transportation mode and a sustainability score of the recommended action, such that environmental sustainability of the recommended action is higher than environmental sustainability of the non-transportation action; and causing display of a first screen of the graphical user interface, the first screen depicting the process flow and a selectable context box positioned to indicate that the selectable context box pertains to the non-transportation action;

receiving an indication of a first user selection of the selectable context box;

based on the first user selection, causing display of a second screen of the graphical user interface, the second screen displaying the recommended action, an indication of an effect of the recommended action on the duration of the transportation, and a selectable benchmark tab;

receiving an indication of a second user selection of the selectable benchmark tab; and based on the second user selection, causing a portion of the second screen to display a benchmark comparison between environmental sustainability associated with the non-transportation action and environmental sustainability associated with similar actions by similar entities.

2. The system of claim 1, wherein the selectable context box contains a visual indication of a sustainability score of the non-transportation action.

3. The system of claim 2, wherein the visual indication is a color indicative of a classification of the sustainability score.

4. The system of claim 2, wherein the benchmark comparison is rendered as a graph having emission usage on a first axis and transportation duration on a second axis, the graph comprising four visually depicted quadrants.

5. The system of claim 3, wherein the environmental sustainability associated with the non-transportation action is displayed as a first point in one of the four visually depicted quadrants, and environmental sustainability associated with each of the similar actions by the similar entities is displayed as a respective additional point in one of the four visually depicted quadrants.

6. The system of claim 1, wherein the machine learning model is trained by a machine learning model based on historical process flow information, the historical process flow information comprising information about past usages of the process flow, the information comprising transportation mode(s) utilized during the past usages, duration of transportation during the past usages, and beginning point of the transportation and an ending point of the transportation during the past usages.

7. The system of claim 1, wherein the operations further comprise:

in response to the display of the recommended action, receiving a user selection of the recommended action; and in response to the user selection, dynamically updating the graphical user interface to replace the non-transportation action with the recommended action within a visual representation of the process flow and to display an updated sustainability score for the process flow.

8. A method comprising, at an entity:

accessing a process flow having a plurality of actions related to at least one transportation mode not known by the entity, the process flow comprising a set of actions to be performed for a plurality of different future cases, the set of actions including some transportation actions as well as some non-transportation actions;

accessing information, for each of the transportation actions, comprising geographic locations of a beginning point and an ending point of a transportation using the at least one transportation mode, and duration of the transportation;

passing the information into a machine learning model trained to predict one or more transportation modes for the plurality of different future cases based on the information, the machine learning model generating one or more predicted transportation modes and a confidence level of each corresponding prediction, wherein the confidence level represents a quantified measure of certainty of the machine learning model in predicting the at least one transportation mode that is not known by the entity;

for each of the one or more predicted transportation modes, calculating a sustainability score indicative of environmental sustainability of a respective transportation mode, by combining a distance between the beginning point of the transportation and the ending point of the transportation with the confidence level, such that the confidence level weights a contribution of the distance to the sustainability score;

automatically selecting a recommended action as a replacement for a non-transportation action in the process flow from a repository of actions based on the sustainability score for each of the one or more predicted transportation mode and a sustainability score of the recommended action, such that environmental sustainability of the recommended action is higher than environmental sustainability of the non-transportation action; and causing display of a first screen of the graphical user interface, the first screen depicting the process flow and a selectable context box positioned to indicate that the selectable context box pertains to the non-transportation action;

receiving an indication of a first user selection of the selectable context box;

based on the first user selection, causing display of a second screen of the graphical user interface, the second screen displaying the recommended action, an indication of an effect of the recommended action on the duration of the transportation, and a selectable benchmark tab;

receiving an indication of a second user selection of the selectable benchmark tab; and based on the second user selection, causing a portion of the second screen to display a benchmark comparison between environmental sustainability associated with the non-transportation action and environmental sustainability associated with similar actions by similar entities.

9. The method of claim 8, wherein the selectable context box contains a visual indication of a sustainability score of the non-transportation action.

10. The method of claim 9, wherein the visual indication is a color indicative of a classification of the sustainability score.

11. The method of claim 9, wherein the benchmark comparison is rendered as a graph having emission usage on a first axis and transportation duration on a second axis, the graph comprising four visually depicted quadrants.

12. The method of claim 9, wherein the environmental sustainability associated with the non-transportation action is displayed as a first point in one of the four visually depicted quadrants, and environmental sustainability associated with each of the similar actions by the similar entities is displayed as a respective additional point in one of the four visually depicted quadrants.

13. The method of claim 8, wherein the machine learning model is trained by a machine learning model based on historical process flow information, the historical process flow information comprising information about past usages of the process flow, the information comprising transportation mode(s) utilized during the past usages, duration of transportation during the past usages, and beginning point of the transportation and an ending point of the transportation during the past usages.

14. The method of claim 8, wherein the sustainability score is based on impact of the transportation on carbon dioxide levels.

15. A non-transitory machine-readable medium storing instructions which, when executed by one or more processors, cause the one or more processors to perform operations at an entity comprising:

accessing a process flow having a plurality of actions related to at least one transportation mode not known by the entity, the process flow comprising a set of actions to be performed for a plurality of different future cases, the set of actions including some transportation actions as well as some non-transportation actions;

accessing information, for each of the transportation actions, comprising geographic locations of a beginning point and an ending point of a transportation using the at least one transportation mode, and duration of the transportation;

passing the information into a machine learning model trained to predict one or more transportation modes for the plurality of different future cases based on the information, the machine learning model generating one or more predicted transportation modes and a confidence level of each corresponding prediction, wherein the confidence level represents a quantified measure of certainty of the machine learning model in predicting the at least one transportation mode that is not known by the entity;

for each of the one or more predicted transportation modes, calculating a sustainability score indicative of environmental sustainability of a respective transportation mode, by combining a distance between the beginning point of the transportation and the ending point of the transportation with the confidence level, such that the confidence level weights a contribution of the distance to the sustainability score;

automatically selecting a recommended action as a replacement for a non-transportation action in the process flow from a repository of actions based on the sustainability score for each of the one or more predicted transportation mode and a sustainability score of the recommended action, such that environmental sustainability of the recommended action is higher than environmental sustainability of the non-transportation action; and causing display of a first screen of the graphical user interface, the first screen depicting the process flow and a selectable context box positioned to indicate that the selectable context box pertains to the non-transportation action;

receiving an indication of a first user selection of the selectable context box;

based on the first user selection, causing display of a second screen of the graphical user interface, the second screen displaying the recommended action, an indication of an effect of the recommended action on the duration of the transportation, and a selectable benchmark tab;

receiving an indication of a second user selection of the selectable benchmark tab; and based on the second user selection, causing a portion of the second screen to display a benchmark comparison between environmental sustainability associated with the non-transportation action and environmental sustainability associated with similar actions by similar entities.

16. The non-transitory machine-readable medium of claim 15, wherein the selectable context box contains a visual indication of a sustainability score of the non-transportation action.

17. The non-transitory machine-readable medium of claim 16, wherein the visual indication is a color indicative of a classification of the sustainability score.

18. The non-transitory machine-readable medium of claim 16, wherein the benchmark comparison is rendered as a graph having emission usage on a first axis and transportation duration on a second axis, the graph comprising four visually depicted quadrants.

19. The non-transitory machine-readable of claim 16, wherein the environmental sustainability associated with the non-transportation action is displayed as a first point in one of the four visually depicted quadrants, and environmental sustainability associated with each of the similar actions by the similar entities is displayed as a respective additional point in one of the four visually depicted quadrants.

20. The non-transitory machine-readable medium of claim 16, wherein the machine learning model is trained by a machine learning model based on historical process flow information, the historical process flow information comprising information about past usages of the process flow, the information comprising transportation mode(s) utilized during the past usages, duration of transportation during the past usages, and beginning point of the transportation and an ending point of the transportation during the past usages.

* * * * *